March 6, 1951    D. SILVERMAN    2,544,569
SIGNALING SYSTEM

Filed Dec. 17, 1946    2 Sheets-Sheet 1

Inventor:
Daniel Silverman.
By William S. Nordburg, Jr.
Attorney

March 6, 1951
D. SILVERMAN
2,544,569
SIGNALING SYSTEM
Filed Dec. 17, 1946
2 Sheets-Sheet 2
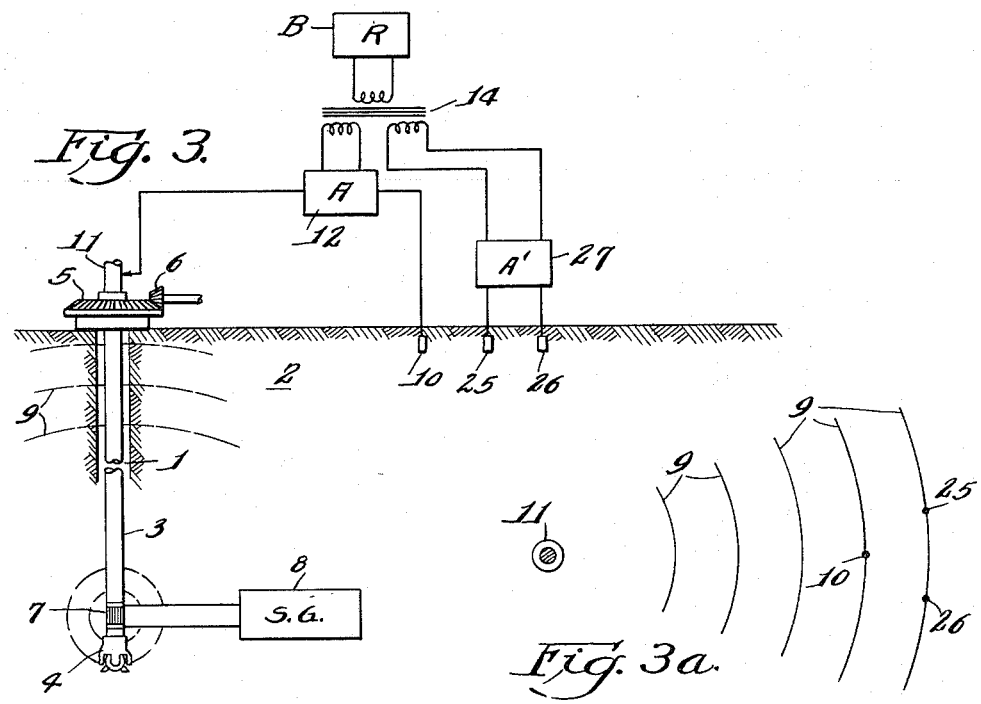
Fig. 3.
Fig. 3a.
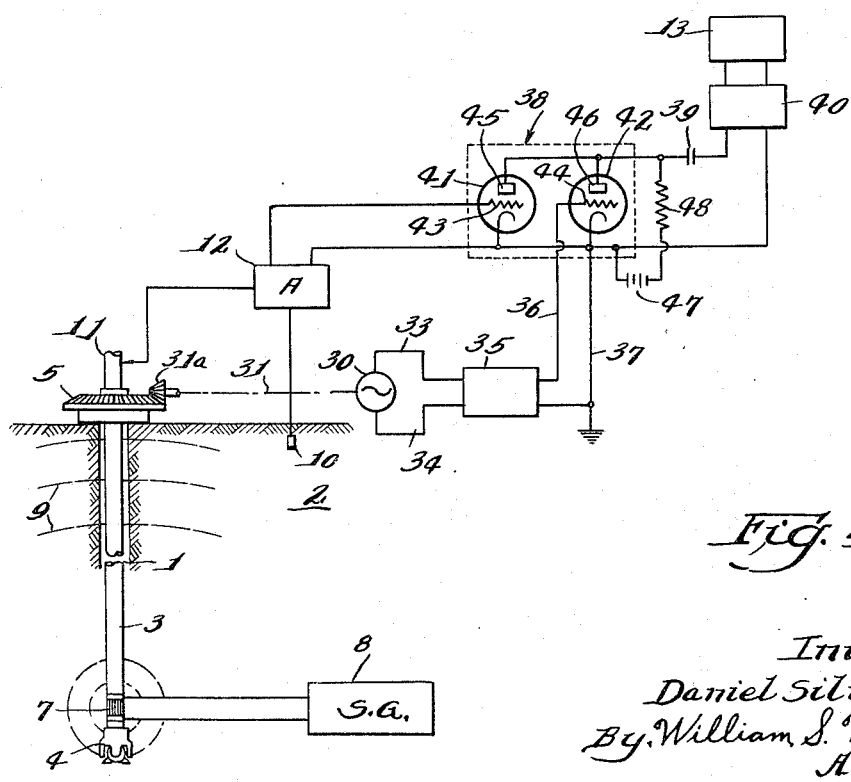
Fig. 4.
Inventor:
Daniel Silverman
By William S. Nordburg, Jr.
Attorney.

Patented Mar. 6, 1951

2,544,569

UNITED STATES PATENT OFFICE 2,544,569

SIGNALING SYSTEM

Daniel Silverman, Tulsa, Okla., assignor to Stanolind Oil and Gas Company, Tulsa, Okla., a corporation of Delaware Application December 17, 1946, Serial No. 716,860

4 Claims. (Cl. 255—1)

This invention relates to signaling systems which employ the earth as a conductor of electric signals, and more particularly to signaling systems for the transmission of signals to and from apparatus within a well during the process of drilling.

Systems for signaling through the earth are highly useful for many purposes, especially for geophysical prospecting, drilling wells, and many operations connected with the producing of oil and gas; for example, such systems may be used to set off explosive charges, fire gun perforator, control valves, and other apparatus below the earth's surface, such as in wells, mines, caves, and the like. One very common use is in connection with logging wells in which data concerning events or the formations at the bottom of the well are determined and reported without an appreciable time delay to surface apparatus for indicating or recording.

In any signaling system, it is important that the signal be free of noise or that the noise be eliminated in order that the signal is not distorted or destroyed. Noise is a term used herein to describe extraneous or foreign currents or potentials which are picked up by the receiving circuit of a signaling system and unless suppressed or filtered out, will be indicated and recorded, thus modifying and rendering erroneous the true signal. In signaling systems such as the type contemplated by my invention, one source of this noise that has been recognized is the earth currents which flow in a horizontal path beneath the surface of the earth. These are usually D. C. or very low frequency A. C. currents of small magnitude. There are various sources of these currents, one being that due to the electrolytic effect of ores, such as the Tellurides.

Because of the presence of these earth currents, a signal receiving circuit, as for example, one comprising a pair of ground electrodes suitably connected to an amplifier and an indicator or recorder, will, in the absence of suitable compensating means, pick-up a small D. C. or low frequency A. C. potential between the electrodes. Where the signal is a pulsating D. C. current, it has been recognized that the D. C. components of this noise influence the signal current and it has been the practice to suppress these earth potentials by a suitable resistance. In signaling systems using alternating current and an amplifier in the receiving circuit, these D. C. potentials have been presumed to be filtered out by the amplifier and thus no other compensation for them has been considered. As to the low frequency earth currents, these are also lost in the amplification stage where the signal frequency is in audio range or radio frequency range.

I have observed, however, that in a well logging-while-drilling system, the signal which is received at the surface of the earth from a signal generator located within a well, will not be consistent for any one position of the signaling electrode when the entire drilling rig is running and when the rig is shut down. This is true even though the potential due to the earth currents was compensated for in a conventional manner prior to the transmission of the signals. I further observed that this discrepancy could be substantially reduced by stopping only the rotary table and the drill of the drilling rig permitting the pumps and engines to continue to run. As a result of these observations, I have concluded that there is another source of noise during drilling which must be taken into account.

I have discovered that the above discrepancy which occurred between the signals that were indicated and recorded in a well logging system while drilling and while not drilling is due to an increase, as well as a change in the character, of the noise entering the receiving circuit. I have further discovered that this additional noise component is due to the seismic-electric effect resulting from the mechanical vibrations transmitted through the earth from the equipment on the surface of the earth as well as from the rotation of the drill in the earth. The existence of a seismic-electric effect, that is, the modulation of an electric current passing through the earth by a seismic disturbance, is a well-known phenomena that has been the basis for seismic-electric methods of prospecting. The effect is the result of a change in the resistance or impedance of the earth's formation due to mechanical vibrations or seismic waves passing through these formations.

It is the object of this invention, therefore, to provide a method of transmitting signals and a signaling system employing the earth as a conductor of electric signals for use in a portion or region of the earth that is being subjected to seismic disturbances with a higher degree of accuracy than has heretofore been possible. It is a further object of this invention to provide such a method and signaling system for use in connection with wells, caves, and the like, whereby noise, which might otherwise be received by systems of this general type resulting from localized seismic disturbances in the earth through which the signals are passing, may be substantially reduced. It is yet a further object to provide a well logging-while-drilling system which will make a log while drilling is in progress substantially identical with the log that would be obtained if the drilling were stopped. These and further objects and advantages of my invention will be apparent from the following description of my invention as preferably applied in a type of signaling system which employs the earth as a conductor of electric signals.

The preferred application is in a well logging-while-drilling system similar to that described in detail in Silverman et al. U. S. Patent 2,354,887 and modified in accordance with the present invention. In this system some characteristic of the formation adjacent the well near the drill bit is detected by an electrical apparatus, such as an insulated electrode surrounded by an electrical field. When an electrical characteristic of the formation changes, as for example, the resistivity or reactance, the field undergoes a corresponding variation, which is transmitted to the surface for detection and recording. Transmission takes place over a path including the earth and the drill pipe, which latter serves as a return circuit. The detecting and recording circuit located on the surface of the earth includes at least two grounded or surface electrodes, one of which may be the drill pipe, electrically connected to a suitable amplifier, which in turn is connected to a suitable indicator and recorder. The recorder makes a chart of the signals received as a function of time or depth.

As pointed out above, there exists between the surface electrodes a small potential having both D. C. and A. C. components which is due to the earth currents. A seismic wave or disturbance set up in the earth in the vicinity of these electrodes would, as a result of the seismic-electric effect, cause a modulation of this potential according to the amplitude and frequency of the seismic wave. In well logging-while-drilling systems previously known to me, the modulated potential would be picked-up and erroneously influence the reception and recording of the true signal. Filtering devices would not be suitable since the modulated earth current may have components of the same frequency as the signal. This is particularly true where the signal current is of a low frequency which is preferable for transmission to great depths below the surface, for example, frequencies of 10 C. P. S. or less.

In accordance with my invention, therefore, I provide in my improved well logging-while-drilling system a source of compensating electrical potential having an electrical characteristic which varies in response to a seismic disturbance in the same manner as some one or more components of the earth currents vary in response to the same disturbance and this varying potential is utilized in opposition to the varying potential due to the earth currents which may otherwise influence the indicated signal so as to cancel out the same, and hence reduce the noise.

In one embodiment of my well logging system, I may employ suitable means, as for example a seismometer, for converting seismic waves into a varying electrical potential having electrical characteristics corresponding to those of the modulated earth currents. The output of the seismometer is introduced into the receiving circuit of my well logging system in opposition to the signal current. In this embodiment, the signal current will comprise the signals transmitted by the logging electrode plus noise due to the earth currents modulated as a result of the seismic-electric effect. Now, since the compensating potential which I introduce into or impress on the receiving circuit is one having electric characteristics indicative of the seismic waves and hence substantially identical to the varying potential of the modulated earth currents, the potentials will cancel out and my recording mechanism will record or indicate substantially the true signal. A modification of this embodiment of my invention comprises introducing into the receiving circuit a compensating potential having a frequency corresponding to the main component of the seismic waves, which I have found by observation is generated by the rotary table and the drill. This latter modification accomplishes at least a substantial reduction in noise level and thus permits the recording of signals which are far more accurate than have heretofore been possible. Because of the complexity of the seismic waves which are introduced by the mechanical vibrations of the various pieces of equipment taking part in the drilling operation, no one embodiment may effectively eliminate all the noise, and consequently I contemplate that it may be advantageous to use two or more methods in combination.

My invention will be better understood when reference is made to the attached drawings of preferred embodiments of well logging systems, forming a part hereof, wherein like numerals have the same significance. In these drawings:

Figure 3 is still a further embodiment similar to Figure 1 wherein the potential introduced into the receiving circuit is that received by a pair of ground electrodes, and wherein preferably the electrodes are equidistant from each of the pick-up electrodes of the receiving circuit, and hence receive only the modulated earth currents.

Figure 3a is a diagrammatic plan view showing the electrode arrangement of the embodiment in Figure 3.

Figure 1:
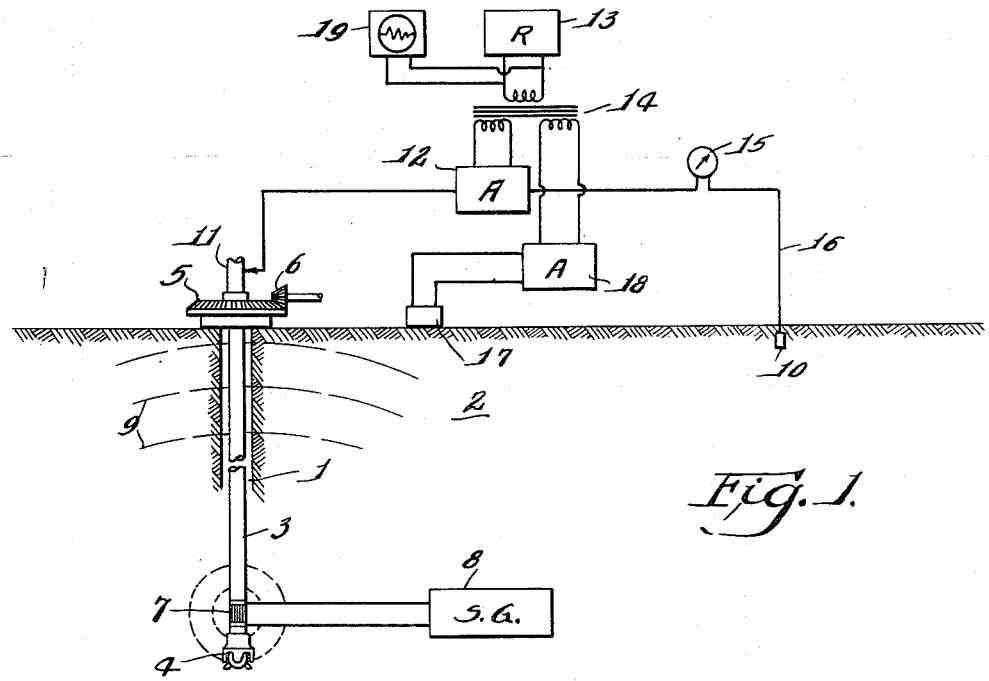
Figure 1 is a vertical cross sectional view through a portion of the earth penetrated by a well, showing diagrammatically an embodiment of my well logging-while-drilling system wherein the output of a seismometer is utilized to oppose the potential received by detecting electrodes whereby the influence of modulated earth currents is substantially nullified.

Figure 4 is still another embodiment similar to Figure 1 wherein the compensating potential introduced into the receiving circuit is generated at a frequency proportional to the R. P. M. of the drill.

Referring particularly now to Figure 1 in the drawings, extending within a well 1 in the earth 2 is a rotary drill pipe 3 including on the end thereof a drill bit 4. The drill pipe is supported by a suitable drilling derrick, not shown, on the surface of the earth and is rotated by a rotary table 5, which in turn is driven through a pinion 6 by a suitable power source not shown. My invention, while shown with reference to rotary drilling, is also applicable to cable drilling.

Coupled to the drill pipe at a point adjacent the drill bit through a suitable transmitting electrode 7, is a signal generator 8 serving as a source of electrical signals within the earth. Signals transmitted by the transmitting electrode are preferably low frequency alternating currents, e. g., 10 C. P. S. or below, although frequencies in the audio and radio range may be used, having varying electrical characteristics, such as frequency or amplitude, indicative of the electrical properties of the formations in the immediate vicinity of the electrode. These frequency or amplitude modulated currents flow through the earth, as represented by paths 9, and they are eventually detected at the surface of the earth by a receiving circuit. This circuit includes at least a pair of surface electrodes 10 and 11. Electrode 11 is preferably the drill pipe 3 as shown. The surface or ground electrode 10 may be non-polarizing or otherwise. The surface electrodes 10 and 11 are connected to an amplifier 12 where the signal is amplified. The output of the amplifier passes to a recorder 13, through a coupling transformer 14 wherein a chart is made showing the variations in the signal as a function of time or in some cases of the depth of the transmitting electrode in a manner well-known in the art.

When the signal generator is silent, a potential will be found to exist between the surface electrodes 10 and 11 which can be indicated by a voltmeter 15 in the conductor 16. This potential is due to the earth currents which, as pointed out above, will comprise both D. C. and low frequency A. C. components. Insofar as the D. C. components are concerned they would not be amplified and it has heretofore been assumed that no error would be introduced by their presence. The same is true even as to the low frequency components, which are generally less than 1 C. P. S. where the amplifier is the conventional audio or radio frequency type. When, however, the drilling apparatus is operating, the voltmeter 15 will show a pulsating potential between the electrode 10 and 11 which will be amplified and thus influence the recorded signal. This pulsating potential is the result of the seismic-electric effect due to the mechanical vibrations introduced into the earth by the various apparatus comprising the drilling rig, including specifically the rotary table and the drill.

To eliminate or reduce this source of noise or at least the D. C. component thereof, I employ a seismometer 17, or equivalent vibration pick-up, which may be any of the conventional types which are used in seismic surveying, preferably positioned on the ground between the drill and the ground electrode, the output of which is fed to an amplifier 18 having suitable phase shifting means. This output current may be a pulsating D. C. current or modulated A. C. having electrical characteristics indicative of the seismic waves to which the seismometer responds. I then impress the amplified output of the seismometer and the output of amplifier 12 of the receiving circuit on the coupling transformer 14. The output current of the seismometer is set in opposition to the signal current by a phase-shifting means in the amplifier 18 and will tend to cancel out that component of the potential picked up by the surface electrodes having similar electrical characteristics due to the seismic-electric effect.

In order to adjust the magnitude to which the output of the seismometer is to be amplified to match the magnitude of the noise and thus to avoid over-correcting, I may, for example, have an oscillograph 19 connected across the secondary of my coupling transformer 14 and adjust the amplifier 18 until I obtain a substantially clear, sharply defined wave form on the oscillograph of minimum amplitude. This will indicate the point at which substantially all the noise has been canceled by the opposing output current of the seismometer and at which substantially the pure signal current is passed to the recorder. Once this setting of the amplifier 18 has been made, the signaling system will operate accurately so long as there is no substantial change in the nature of the seismic disturbances produced by the drilling equipment. It will, of course, be apparent that where the signal generator within the well can be momentarily stopped that it will not be necessary to utilize the oscillograph to adjust properly the amplifier 18. In this case, it is only necessary to adjust the amplifier to give a minimum reading on the recorder, which minimum reading will be the zero point on the graph recording the logging signals. In most of the conventional logging systems, the signal generator, once placed within a well, operates automatically and, therefore, it is not possible to show on the recorder solely the noise in the receiving circuit; however, a time schedule may be set up whereby the generator would shut periodically.

Figure 2:
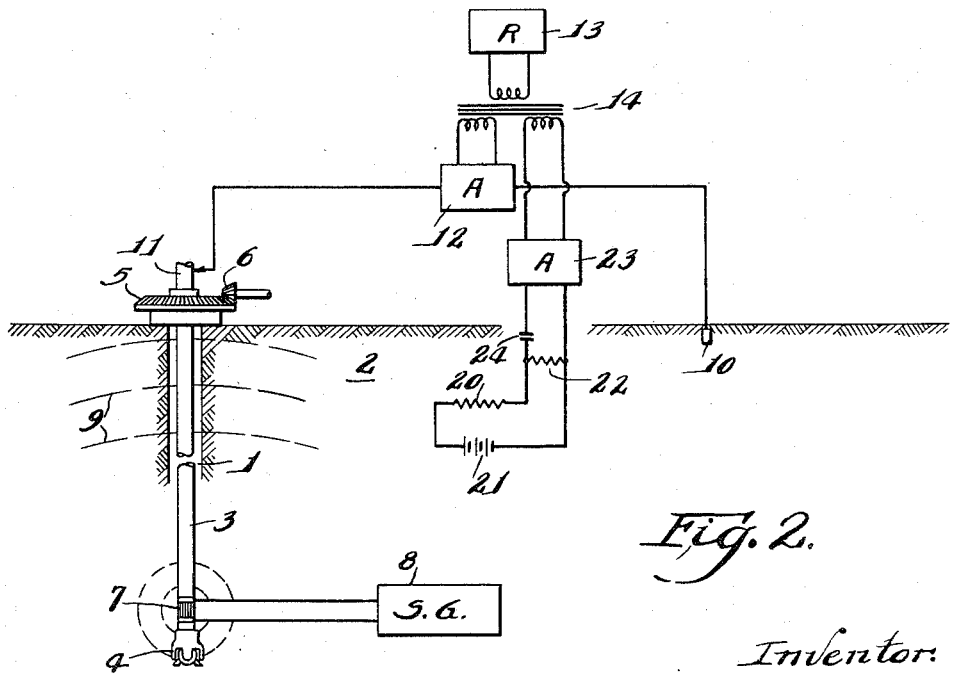
Figure 2 is similar to Figure 1 wherein a strain gage replaces the seismometer.

In the embodiment of Figure 2, in place of the conventional seismometer, I discovered that since the noise will have a wave form characteristic of mechanical vibrations, I may utilize a strain gage 20 as my pick-up for the seismic waves. The strain gage includes an extensible metallic member which becomes a variable resistance upon elongation and contraction due to mechanical vibration. By placing the gage in a position where the mechanical vibrations of the drilling equipment can be transmitted to the gage causing it to vibrate with the same periodicity and by passing a current through it and a series resistance, I obtain another source of potential across the resistance having the electrical characteristics of frequency and wave form similar to the noise due to the seismic-electric effect.

Although the strain gage, as the seismometer, may be secured to or mounted on one of the major sources of the vibration, such as the derrick support for the drill, in the floor of the drill derrick, or in some other structural part of the drilling mechanism, possibly a part of the rotary table, I prefer to bury it in a shallow hole in the surface of the earth and position it in a radial alignment with the direction of the seismic waves, preferably between the surface electrodes, in order that it may be more responsive to the seismic waves.

The output of the strain gage circuit, which circuit includes a battery 21 and a resistance 22 in series with the gage element, is fed to the amplifier and phase shifter 23, preferably through a blocking condenser 24. The output of the amplifier is then impressed on the coupling transformer 14 for the recorder 13 and the magnitude of the output adjusted as in the case of Figure 1 to give a clear wave of minimum value. Incidentally, this method of adjusting magnitude is applicable to any of the embodiments described herein.

In Figures 3 and 3a, I have shown an embodiment of my invention wherein my opposing or correction current is the noise due to the modulation of the earth currents which I pick up to the exclusion of the signaling current. These modulated earth currents I then amplify and introduce into my receiving circuit in opposition to the signals being received. I accomplish this by having a second receiver station comprising a pair of grounded electrodes 25 and 26 which I space equidistant from the drill pipe 2 and preferably from the grounded electrode 10. A varying potential difference will occur between these two electrodes due to the seismic-electric effect on the earth currents, as is well-known in seismic-electric surveying, which I amplify in an amplifier and phase shifter 27, the output of which is then fed to the coupling transformer 14. By arranging my electrodes 25 and 26 in the preferred manner described above, they both lie on an equi-potential line of the field of the signaling electrode and consequently do not receive any component of the signaling current. This embodiment requires very simple apparatus and gives very satisfactory results.

In Figure 4, I have shown an apparatus, wherein the current or potential that I introduce into my receiving circuit to cancel the noise component due to the seismic-electric effect, is not indicative of the composite seismic disturbance but of a major component of such disturbance which, as indicated above, I have observed in the case of my example to be the rotary table and the drill. Therefore, in this embodiment I generate, by means of a generator 30 connected through shaft 31 and gear 31a to the rotary table 5, an alternating current having a frequency which is proportional to the R. P. M. of the rotary table and hence proportional to the component of seismic disturbance in the earth due to the rotary table and drill. This alternating current from generator 30 is passed through conductors 33 and 34 to a phase-shifting means 35 of any conventional design and thence through conductors 36 and 37 to a mixing circuit 38. The output of the amplifier 12 is also fed to this mixing circuit wherein the component of the output of the amplifier 12, due to the noise picked up in the receiving circuit and resulting from the seismic-electric effect of the drill and rotary table, is canceled out or reduced by the alternating current from the generator 30. The output of the mixing circuit is fed through a blocking condenser 39 to another amplifier 40 and then to the recorder 13. An example of a mixing circuit which I may use comprises a pair of triodes 41 and 42. The output from amplifier 12 is fed to the grid 43 of tube 41, while that from the generator 30 is fed to the grid 44 of tube 42. The plates 45 and 46 of the two tubes are connected in parallel through the blocking condenser 39 to the amplifier 60. The plate voltage for the triodes is supplied by a battery 47 connected into the mixing circuit through a plate resistor 48. The filament current is supplied by another battery not shown.

Though I have described several embodiments of my invention as applied to a well logging-while-drilling signaling system, it will be readily apparent to those skilled in the art that with little modification my invention may be applied to other signaling systems whether or not the signal is transmitted from within the well, as in well logging, or from the surface of the earth to a receiving station within the well. Furthermore, it will be applicable whether the signal current is preferably a low frequency alternating current, a D. C. or high frequency alternating current. My invention is applicable to any signaling system wherein the noise is received along with the desired signal by the receiving system and wherein at least one component of that noise is due to the seismic disturbances in the earth. Other embodiments and modifications will be apparent to those skilled in the art and no limitations are intended by the above-described examples except as are contained in the following claims.

I claim:

1. In a signaling system for use in a portion of the earth being subjected to seismic disturbances wherein signals are sent between a remote point beneath the surface of the earth and a point on the surface along a path including the earth as a conductor, and wherein the seismic disturbances modulate earth currents near the surface of the earth due to the seismic-electric effect, which modulated earth currents adversely influence detection of the signals, the combination of a primary source of potential, a transmitting circuit including said primary source of potential for transmitting electrical signals through the earth, means coupled to the earth for detecting a varying electrical potential in the earth which is derived from said signals and said modulated earth currents, an electrical generator providing a second potential independent of said varying electrical potential and having a frequency substantially equal to at least one component of said modulated earth currents, and means for impressing said second potential upon the circuit of said detecting means in such time relationship that said second potential is in electrical opposition to said component of said modulated earth currents of the same frequency.

2. In a signaling system which employs the earth as a conductor of electrical signals, for use in a portion of the earth being subjected to seismic disturbances, means for introducing electrical signals into the earth, means coupled to the earth for detecting a varying electrical voltage in the earth, said electrical voltage being derived from said signals and from electrical disturbances including seismic-electric effects, means independent of said detecting means for supplying a potential having electrical characteristics indicative of said seismic disturbances, and means for impressing said potential on said detecting mean in such time relationship with the varying electrical voltage received that said potential is in electrical opposition to that portion of said varying electrical voltage which is derived from said seismic disturbances.

3. In a signaling system for use in a portion of the earth being subjected to seismic disturbances, means for introducing electrical signals into the earth, means coupled to the earth for detecting a varying electrical voltage in the earth, said varying electrical voltage being derived from said signals and from electrical disturbances including seismic-electric effects due to said seismic disturbances, an electric generator independent of said detecting means and having an output of a frequency substantially equal to at least one component of the seismic waves in the earth due to the presence of said seismic disturbances, and circuit means for combining the output of said generator and the output of said voltage-detecting means, with the generator output being in electrical opposition to the component of said electrical voltage due to said seismic disturbances.

4. In a well signaling system for use in a well during rotary drilling, means for introducing electrical signals into the portion of the earth subjected to seismic disturbances by said drilling, means coupled to the earth for receiving said electrical signals after transmission through the earth, said receiving means being sensitive also to electrical disturbances in the earth due to the seismic-electric effect of said drilling, an electric generator independent of said receiving means and coupled to the drilling device for generating a potential having a frequency proportional to the speed of rotation of the drill, and an electrical circuit coupled to said signal-receiving means and to said generator for combining the outputs of said signal-receiving means and of said electric generator in such time and phase relationship that said generator output is in electrical opposition to at least one component of said electrical disturbances received by said signal-receiving means.

DANIEL SILVERMAN.

REFERENCES CITED

The following references are of record in the file of this patent:

UNITED STATES PATENTS

| Number | Name | Date |
| --- | --- | --- |
| 2,153,802 | Jakosky | Apr. 11, 1939 |
| 2,215,297 | Owen | Sept. 17, 1940 |
| 2,216,452 | Owen | Oct. 1, 1940 |
| 2,354,887 | Silverman et al. | Aug. 1, 1944 |
| 2,364,957 | Douglas | Dec. 12, 1944 |
| 2,376,730 | Steinhoff | May 22, 1945 |
| 2,397,255 | Ennis | Mar. 26, 1946 |
| 2,401,371 | Pearson et al. | June 4, 1946 |
| 2,428,155 | Guyod | Sept. 30, 1947 |
| 2,431,600 | Wolf | Nov. 25, 1947 |
| 2,438,217 | Johnson | Mar. 25, 1948 |
| 2,454,911 | Clewell | Nov. 30, 1948 |
| 2,456,401 | Gilmore | Dec. 14, 1948 |